(12) United States Patent
Bolisay et al.

(10) Patent No.: US 12,549,126 B2
(45) Date of Patent: Feb. 10, 2026

(54) LIGHTWEIGHT, LOW STOW VOLUME, DEPLOYABLE SOLAR CONCENTRATOR FOR SPACE APPLICATIONS

(71) Applicant: L'Garde, Inc., Tustin, CA (US)

(72) Inventors: Linden Bolisay, Las Vegas, NV (US); Arthur Palisoc, Tustin, CA (US)

(73) Assignee: L'Garde, Inc., Tustin, CA (US)

( * ) Notice: Subject to any disclaimer, the term of this patent is extended or adjusted under 35 U.S.C. 154(b) by 578 days.

(21) Appl. No.: 17/929,275

(22) Filed: Sep. 1, 2022

(65) Prior Publication Data

US 2023/0155545 A1  May 18, 2023

Related U.S. Application Data

(60) Provisional application No. 63/371,631, filed on Aug. 16, 2022, provisional application No. 63/264,027, filed on Nov. 12, 2021.

(51) Int. Cl.
*H02S 40/22* (2014.01)
*B64G 99/00* (2009.01)

(52) U.S. Cl.
CPC .............. *H02S 40/22* (2014.12); *B64G 99/00* (2022.08)

(58) Field of Classification Search
CPC .......... Y02E 10/47; H02S 40/22; F24S 25/13; F24S 25/50; F24S 2025/012
See application file for complete search history.

(56) References Cited

U.S. PATENT DOCUMENTS

| | | |
|---|---|---|
| 3,175,619 A | 3/1965 | Reed, Jr. |
| 3,354,458 A | 11/1967 | Rottmayer |
| 3,521,290 A | 7/1970 | Bahiman et al. |
| 3,780,375 A | 12/1973 | Cummings et al. |
| 3,783,573 A | 1/1974 | Vaughan |
| 3,959,622 A | 5/1976 | Bogdanov et al. |
| 4,033,225 A | 7/1977 | Kartzmark, Jr. |
| 4,092,453 A | 5/1978 | Jonda |
| 4,163,235 A | 7/1979 | Schultz |
| 4,171,876 A | 10/1979 | Wood |
| 4,195,416 A | 4/1980 | Hall |
| 4,262,867 A | 4/1981 | Piening |
| 4,475,323 A | 10/1984 | Schwartzberg et al. |
| 4,480,415 A | 11/1984 | Truss |
| 4,557,083 A | 12/1985 | Zanardo |
| 4,579,302 A | 4/1986 | Schneider |
| 4,587,777 A | 5/1986 | Vasques |
| 4,604,844 A | 8/1986 | Mikulas, Jr. |
| 4,647,329 A | 3/1987 | Oono |

(Continued)

FOREIGN PATENT DOCUMENTS

| | | |
|---|---|---|
| CH | 666235 | 7/1988 |
| CN | 102173312 | 9/2011 |

(Continued)

OTHER PUBLICATIONS

Extended European Search Report for European Patent Application No. 20798150, dated Dec. 21, 2022, 9 pages.

(Continued)

*Primary Examiner* — Ko-Wei Lin
(74) *Attorney, Agent, or Firm* — Kari L. Barnes

(57) ABSTRACT

Exemplary embodiments described herein may include lightweight, low stow volume solar concentrator.

28 Claims, 9 Drawing Sheets

(56) References Cited

U.S. PATENT DOCUMENTS

| | | | |
|---|---|---|---|
| 4,745,725 A | 5/1988 | Onoda | |
| 4,759,517 A | 7/1988 | Clark | |
| 4,765,114 A | 8/1988 | Wesselski | |
| 4,802,417 A | 2/1989 | Chen | |
| 4,820,170 A | 4/1989 | Redmond et al. | |
| 4,852,307 A | 8/1989 | Goudeau | |
| 5,003,736 A | 4/1991 | Okazaki | |
| 5,042,390 A | 8/1991 | Schotter | |
| 5,085,018 A | 2/1992 | Kitamura et al. | |
| 5,163,262 A | 11/1992 | Adams | |
| 5,184,444 A | 2/1993 | Warden | |
| 5,351,417 A | 10/1994 | Rubin | |
| 5,451,975 A | 9/1995 | Miller | |
| 5,507,451 A | 4/1996 | Karnish | |
| 5,615,847 A | 4/1997 | Bourlett | |
| 5,680,145 A * | 10/1997 | Thomson | H01Q 15/161 343/915 |
| 5,979,833 A | 11/1999 | Eller | |
| 6,028,570 A | 2/2000 | Gilger et al. | |
| 6,225,965 B1 | 5/2001 | Gilger | |
| 6,260,797 B1 | 7/2001 | Palmer | |
| 6,286,410 B1 | 9/2001 | Leibolt | |
| 6,311,015 B1 | 10/2001 | Shih | |
| 6,323,827 B1 | 11/2001 | Gilger et al. | |
| 6,388,637 B1 | 5/2002 | Davis | |
| 6,508,036 B1 | 1/2003 | Cadogan | |
| 6,568,640 B1 | 5/2003 | Barnett | |
| 6,640,739 B2 | 11/2003 | Woodall | |
| 6,647,668 B1 | 11/2003 | Choee et al. | |
| 6,655,637 B1 | 12/2003 | Robinson | |
| 6,830,222 B1 | 12/2004 | Nock | |
| 6,904,722 B2 | 6/2005 | Brown | |
| 7,104,507 B1 | 9/2006 | Knight | |
| 7,285,719 B2 * | 10/2007 | Conger | F24S 25/50 52/173.3 |
| 7,337,097 B2 | 2/2008 | Ih | |
| 7,941,978 B1 | 5/2011 | Pollard | |
| 7,963,084 B2 | 6/2011 | Merrifield | |
| 8,056,461 B2 | 11/2011 | Bossert | |
| 8,066,227 B2 | 11/2011 | Keller | |
| 8,109,472 B1 | 2/2012 | Keller | |
| 8,115,149 B1 | 2/2012 | Manole | |
| 8,274,030 B2 * | 9/2012 | Lee | H10F 77/488 136/246 |
| 8,356,774 B1 | 1/2013 | Banik et al. | |
| 8,376,282 B2 | 2/2013 | Keller | |
| 8,511,298 B2 * | 8/2013 | Ven | F24S 23/79 126/684 |
| 8,770,522 B1 | 7/2014 | Murphey et al. | |
| 8,813,455 B2 | 8/2014 | Merrifield | |
| 9,146,043 B2 | 9/2015 | Pedretti | |
| 9,187,191 B1 | 11/2015 | Jensen | |
| 9,249,565 B2 | 2/2016 | Merrifield | |
| 9,296,270 B2 | 3/2016 | Parks | |
| 9,499,285 B2 | 11/2016 | Garber | |
| 9,666,948 B1 | 5/2017 | Rao et al. | |
| 9,666,950 B1 | 5/2017 | Johnson et al. | |
| 9,742,058 B1 | 8/2017 | O'Neil, Jr. | |
| 9,755,318 B2 * | 9/2017 | Mobrem | H01Q 15/161 |
| 9,810,820 B1 | 11/2017 | Starkovich | |
| 9,828,772 B2 | 11/2017 | Murphey et al. | |
| 10,024,050 B2 | 7/2018 | Merrifield | |
| 10,036,878 B2 | 7/2018 | Greschik | |
| D850,362 S * | 6/2019 | Bodurow | D13/102 |
| 10,347,962 B1 | 7/2019 | Georgakopoulos | |
| 10,587,035 B2 | 3/2020 | Freebury | |
| 10,642,011 B2 | 5/2020 | Greschik et al. | |
| 10,651,531 B2 | 5/2020 | Palisoc et al. | |
| 10,774,518 B1 | 9/2020 | Eller | |
| 10,989,443 B1 * | 4/2021 | Sercel | H10F 77/488 |
| 11,142,349 B2 | 10/2021 | Barnes | |
| 11,316,242 B2 | 4/2022 | Palisoc et al. | |
| 11,358,738 B1 | 6/2022 | Eller et al. | |
| 11,713,141 B2 | 8/2023 | Barnes | |
| 11,870,128 B2 | 1/2024 | Palisoc et al. | |
| 11,905,044 B2 | 2/2024 | Barnes et al. | |
| 11,973,258 B2 | 4/2024 | Bolisay | |
| 2002/0112417 A1 | 8/2002 | Brown | |
| 2002/0116877 A1 | 8/2002 | Breitbach et al. | |
| 2003/0010869 A1 | 1/2003 | Kawaguchi | |
| 2003/0010870 A1 | 1/2003 | Chafer | |
| 2003/0132543 A1 | 7/2003 | Gardner | |
| 2003/0195499 A1 | 10/2003 | Prakash et al. | |
| 2004/0085615 A1 | 5/2004 | Hill | |
| 2004/0113020 A1 | 6/2004 | Wang | |
| 2004/0140402 A1 | 7/2004 | Wehner | |
| 2004/0148901 A1 | 8/2004 | Cadogan et al. | |
| 2004/0194397 A1 | 10/2004 | Brown | |
| 2005/0103939 A1 | 5/2005 | Bischof et al. | |
| 2005/0104798 A1 | 5/2005 | Nolan et al. | |
| 2005/0126106 A1 | 6/2005 | Murphy | |
| 2005/0168393 A1 | 8/2005 | Apostolos | |
| 2005/0209835 A1 | 9/2005 | Ih | |
| 2006/0181788 A1 | 8/2006 | Harada | |
| 2007/0008232 A1 | 1/2007 | Weinstein | |
| 2007/0145195 A1 | 6/2007 | Thomson | |
| 2008/0035798 A1 | 2/2008 | Kothera | |
| 2008/0111031 A1 | 5/2008 | Mobrem | |
| 2008/0228332 A1 | 9/2008 | Hindle | |
| 2009/0001219 A1 | 1/2009 | Golecki et al. | |
| 2009/0002257 A1 | 1/2009 | de Jong | |
| 2009/0114271 A1 | 5/2009 | Stancel | |
| 2009/0124743 A1 | 5/2009 | Lee | |
| 2009/0133355 A1 | 5/2009 | Mobrem | |
| 2009/0294595 A1 | 12/2009 | Pellegrino | |
| 2010/0018026 A1 | 1/2010 | Bassily | |
| 2010/0094272 A1 | 4/2010 | Rossetto et al. | |
| 2010/0269446 A1 | 10/2010 | Merrifield | |
| 2010/0320185 A1 | 12/2010 | Springer et al. | |
| 2011/0023484 A1 | 2/2011 | Lu | |
| 2011/0061210 A1 | 3/2011 | Kwak | |
| 2011/0252716 A1 | 10/2011 | Pedretti | |
| 2012/0097799 A1 | 4/2012 | Stone | |
| 2012/0205488 A1 | 8/2012 | Powell | |
| 2012/0297717 A1 | 11/2012 | Keller et al. | |
| 2012/0313569 A1 | 12/2012 | Curran | |
| 2013/0069833 A1 | 3/2013 | Lippincott | |
| 2013/0101845 A9 | 4/2013 | Hiel | |
| 2013/0114155 A1 | 5/2013 | Eguro | |
| 2013/0175401 A1 | 7/2013 | Starke et al. | |
| 2013/0207881 A1 | 8/2013 | Fujii et al. | |
| 2013/0263548 A1 | 10/2013 | Merrifeld | |
| 2013/0292518 A1 | 11/2013 | Lagadec | |
| 2014/0030455 A1 | 1/2014 | Ruschulte | |
| 2014/0042275 A1 | 2/2014 | Abrams et al. | |
| 2014/0048121 A1 * | 2/2014 | Schwartz | H10F 77/488 126/694 |
| 2014/0099853 A1 | 4/2014 | Condon | |
| 2014/0151485 A1 | 6/2014 | Baudasse et al. | |
| 2015/0194733 A1 * | 7/2015 | Mobrem | H01Q 15/161 343/915 |
| 2015/0244081 A1 * | 8/2015 | Mobrem | H01Q 15/161 343/915 |
| 2015/0288072 A1 | 10/2015 | Medzmariashvili | |
| 2015/0336685 A1 | 11/2015 | Wan | |
| 2016/0046372 A1 | 2/2016 | Barnes et al. | |
| 2016/0054097 A1 | 2/2016 | Sylvia | |
| 2016/0130020 A1 | 5/2016 | Chambert | |
| 2016/0136820 A1 | 5/2016 | Lessing | |
| 2016/0159475 A1 | 6/2016 | Schank | |
| 2016/0288453 A1 | 10/2016 | Mejia-Ariza | |
| 2016/0311558 A1 | 10/2016 | Turse | |
| 2016/0360803 A1 * | 12/2016 | Bell, Sr. | G08B 5/004 |
| 2016/0361910 A1 | 12/2016 | Franck, III | |
| 2017/0058524 A1 | 3/2017 | Fernandez | |
| 2017/0222308 A1 | 8/2017 | Freebury | |
| 2017/0298718 A1 | 10/2017 | Mills et al. | |
| 2017/0310014 A1 | 10/2017 | Liu et al. | |
| 2017/0321414 A1 | 11/2017 | Merrifield | |
| 2018/0151938 A1 | 5/2018 | Rudys | |
| 2018/0257795 A1 | 9/2018 | Ellinghaus | |
| 2019/0036221 A1 | 1/2019 | Muesse | |
| 2019/0097300 A1 | 3/2019 | Palisoc | |
| 2019/0144141 A1 | 5/2019 | Barnes | |

(56) References Cited

U.S. PATENT DOCUMENTS

| | | | |
|---|---|---|---|
| 2019/0207552 A1* | 7/2019 | Bodurow | H02S 20/22 |
| 2020/0130872 A1 | 4/2020 | Spencer | |
| 2021/0159604 A1 | 5/2021 | Palisoc et al. | |
| 2022/0170669 A1* | 6/2022 | Cheng | F24S 20/40 |
| 2022/0181765 A1 | 6/2022 | Barnes et al. | |
| 2022/0388694 A1 | 12/2022 | Barnes | |
| 2022/0402632 A1 | 12/2022 | Yamamoto et al. | |
| 2023/0146184 A1* | 5/2023 | McCutcheon | F24S 30/452 |
| | | | 136/246 |
| 2023/0155545 A1 | 5/2023 | Bolisay et al. | |
| 2023/0254946 A1 | 8/2023 | Takagaki | |
| 2023/0399847 A1* | 12/2023 | Greschik | H01Q 15/161 |
| 2024/0025568 A1 | 1/2024 | Barnes | |
| 2024/0088539 A1 | 3/2024 | Palisoc et al. | |
| 2024/0088546 A1 | 3/2024 | Polyakov | |
| 2024/0109265 A1 | 4/2024 | Palisoc et al. | |
| 2024/0401844 A1* | 12/2024 | Muñoz Saiz | F24S 20/20 |

FOREIGN PATENT DOCUMENTS

| | | |
|---|---|---|
| CN | 104393421 | 3/2015 |
| CN | 204216229 | 3/2015 |
| CN | 104691784 | 6/2015 |
| CN | 106516164 | 3/2017 |
| CN | 105480436 | 7/2017 |
| CN | 106976571 | 7/2017 |
| CN | 107150818 | 9/2017 |
| CN | 109449559 | 3/2019 |
| CN | 111806723 | 11/2021 |
| CN | 110371324 | 3/2022 |
| CN | 112389683 | 5/2022 |
| DE | 1456133 | 6/1965 |
| DE | 3437824 | 4/1986 |
| DE | 10147144 | 2/2003 |
| DE | 102011082497 | 3/2013 |
| EP | 524888 | 1/1993 |
| FR | 3081842 | 12/2019 |
| GB | 2322236 | 8/1998 |
| JP | 60125003 | 7/1985 |
| JP | 1997277996 | 10/1997 |
| JP | 2001196844 | 7/2001 |
| JP | 2002362500 | 12/2002 |
| JP | 2004221897 | 8/2004 |
| JP | 2014189145 | 10/2014 |
| JP | 2016030486 | 3/2016 |
| JP | 2018104250 | 7/2018 |
| WO | 20120092933 | 7/2012 |
| WO | 20150116280 | 8/2015 |
| WO | 20170151689 | 9/2017 |
| WO | 20200249900 | 12/2020 |
| WO | 20210224572 | 11/2021 |
| WO | 20220109575 | 5/2022 |

OTHER PUBLICATIONS

International Search Report and Written Opinion for PCT/US2021/72477 dated Mar. 25, 2022, 10 pages.

International Search Report and Writen Opinion for PCT/US2022/079841 dated Mar. 10, 2023, 7 pages.

Costanza et al, "Design and Characterization of a Small-Scale Solar Sail Deployed by NiTi Shape Memory Actuators", Jun. 2016, Science Direct, All Pages (2016).

Fu Bo et al: "Solar sail technology—A state of the art review," Progress in Aerospace Sciences, vol. 86, Aug. 3, 2016 (Aug. 3, 2016), pp. 1-19.

Jimenez, "Mechanics of Thin Carbon Fiber Composites With a Silicone Matrix," Thesis (2011) California Institute of Technology, <http://thesis.library.caltech.edu/6271/1/ThesisMain.pdf>.

K.Sonoda, "Materials Application for Spacerafт Use in Japan," in IEEE Electrical Insulation Magazine, vol. 8, No. 2, pp. 18-26, Mar.-Apr. 1992, doi: 10.1109/57.127012. (1992).

B. Siriguleng, W. Zhang, T. Liu, Y.Z Liu, "Vibration Modal Experiments and Modal Interactions of a Large Space Deployable Antenna With Carbon Fiber Material and Ring-Truss Structure," Science Direct, Engineering Structures 207 (2020) https://doi.org/10.1016/j.engstruct.2019.109932, available online Nov. 21, 2019.

* cited by examiner

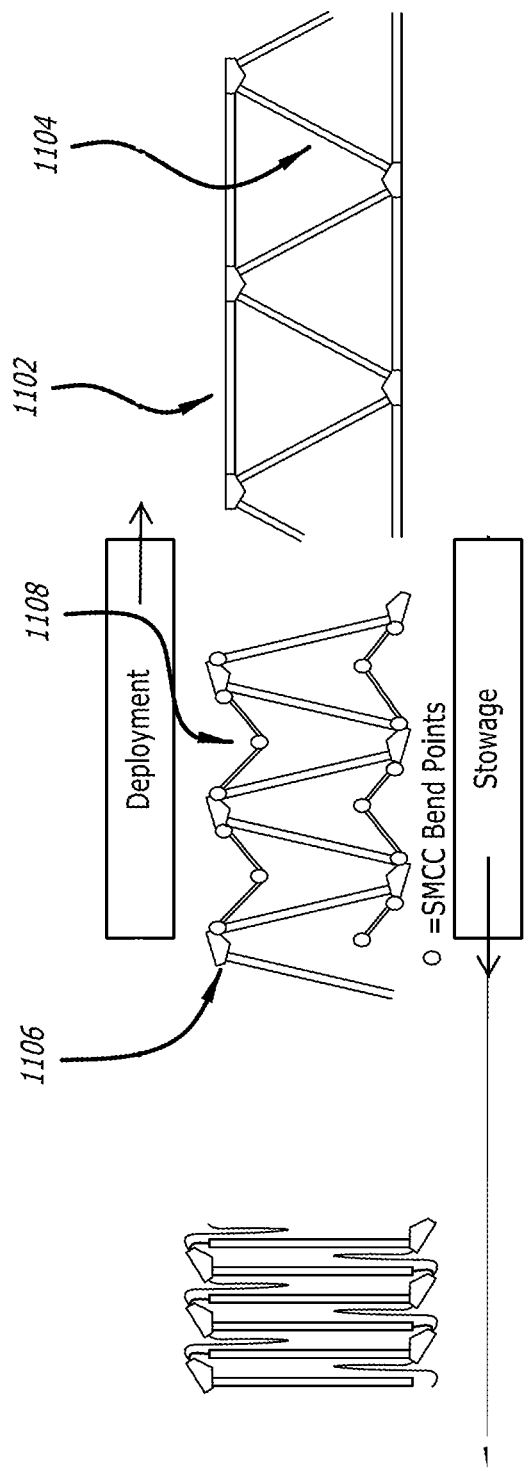

LIGHTWEIGHT, LOW STOW VOLUME, DEPLOYABLE SOLAR CONCENTRATOR FOR SPACE APPLICATIONS

PRIORITY

This application claims priority to U.S. Provisional Application No. 63/264,027, filed Nov. 12, 2021, and U.S. Provisional Application No. 63/371,631, filed Aug. 16, 2022, which are incorporated by reference in their entirety into this application.

GOVERNMENT LICENSE RIGHTS

This invention was made with government support under 80NSSC21C0280 awarded by NASA. The government has certain rights in the invention.

BACKGROUND

Deployable solar collectors may be used in space and lunar environments in order to harvest energy from the sun. There are a number of deployable solutions that still contain many problems. For example, inflatable designs require the addition of gas over time as the enclosing structures will inevitably outgas over time.

SUMMARY

Exemplary embodiments described herein may include lightweight, low stow volume configurations for a solar concentrator.

DRAWINGS

FIGS. 11A-11C illustrates the deployment from a stowed configuration to a deployed configuration of the support frame of an exemplary solar collector according to embodiments described herein.

DESCRIPTION

Figure 1:
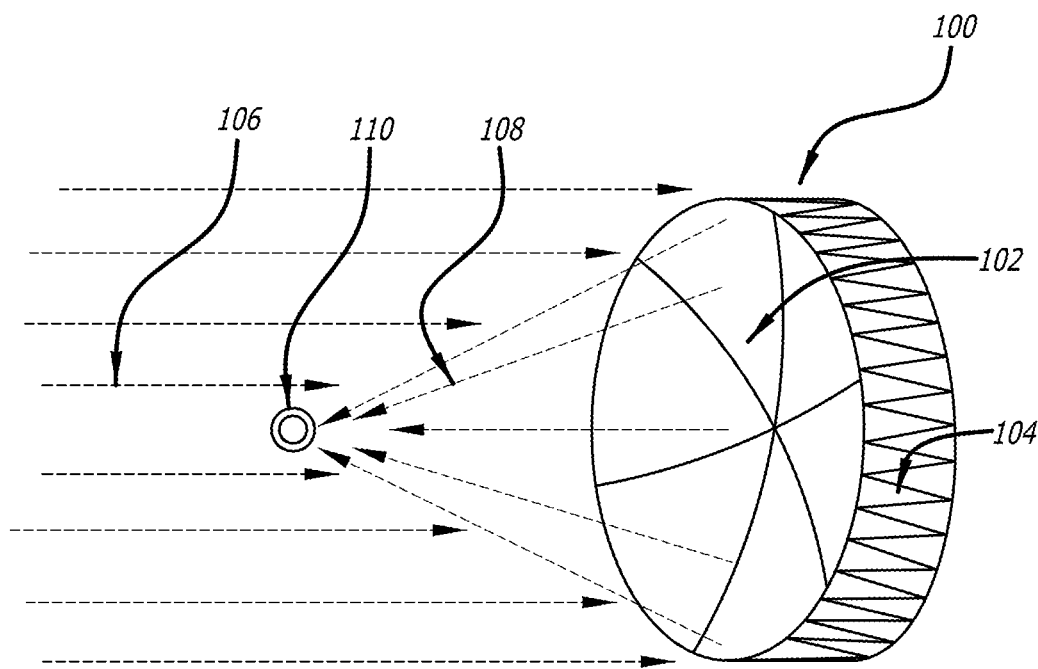
FIG. 1 illustrates an exemplary solar collector according to embodiments described herein.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments described herein may include a solar collector. The solar collector may include an outer frame and a reflective surface.

Exemplary embodiments of the outer frame may transition from a stowed configuration to a deployed configuration. In the stowed configuration, members of the frame may be configured to flex, bend, or otherwise change shape, orientation, or dimension in order to accommodate the change in configuration between the stowed and deployed configurations.

In an exemplary embodiment, the reflective surface may be tessellated such that the surface material does not need to be deformed (folded) in the stowed configuration. The reflective surface may be approximately parabolic in shape, although the individual tessellated members may be flat, curved about a single axis, curved about two axis, or otherwise shaped so the resulting parabolic surface is a step-wise approximation of the overall shape. Exemplary embodiments of the individual reflective members may comprise a generally triangular shape, and may have catenary shaped perimeter side edges. The individual reflective members may be retained under tension in the deployed configuration by attaching to a tensioned mesh weave. Exemplary embodiments of the mesh weave may be used to deform the reflective surface into a final desired shape in the deployed configuration. In an exemplary embodiment, the individual reflective members may be rigid to retain a desired shape. The desired shape may be flat. The desired shape may also be curved in any configuration to improve the overall curvature of the reflective surface defined by the plurality of individual reflective members.

Exemplary embodiments described herein may include a lightweight, low stow volume solar concentrator. In an exemplary application, exemplary embodiments described herein may be easily deployed in a lunar environment for in-situ resource utilization.

Although embodiments of the invention may be described and illustrated herein in terms of a solar collector having a reflective surface, it should be understood that embodiments of this invention are not so limited, but are additionally applicable to other deployable structures. For example, the same outer frame and tessellated surface structure may be used for reflectors, collectors, antennas, etc. The solar collector may also be used in an embodiment that is simply for solar concentration and may be used without the collector described herein.

FIG. 1 illustrates an exemplary solar collector according to embodiments described herein. Exemplary embodiments of the solar collector 100 described herein may include a reflective surface 102 and an outer frame 104. As illustrated, the reflective surface 102 may be configured to reflect rays 108 from the sunlight 106 to a focal area 110.

Exemplary embodiments of the outer frame 104 may be configured to support the reflective surface 102. The outer frame 104, as illustrated may be a generally cylindrical form having a circular cross section. Other exemplary shapes are also contemplated herein.

Figure 2:
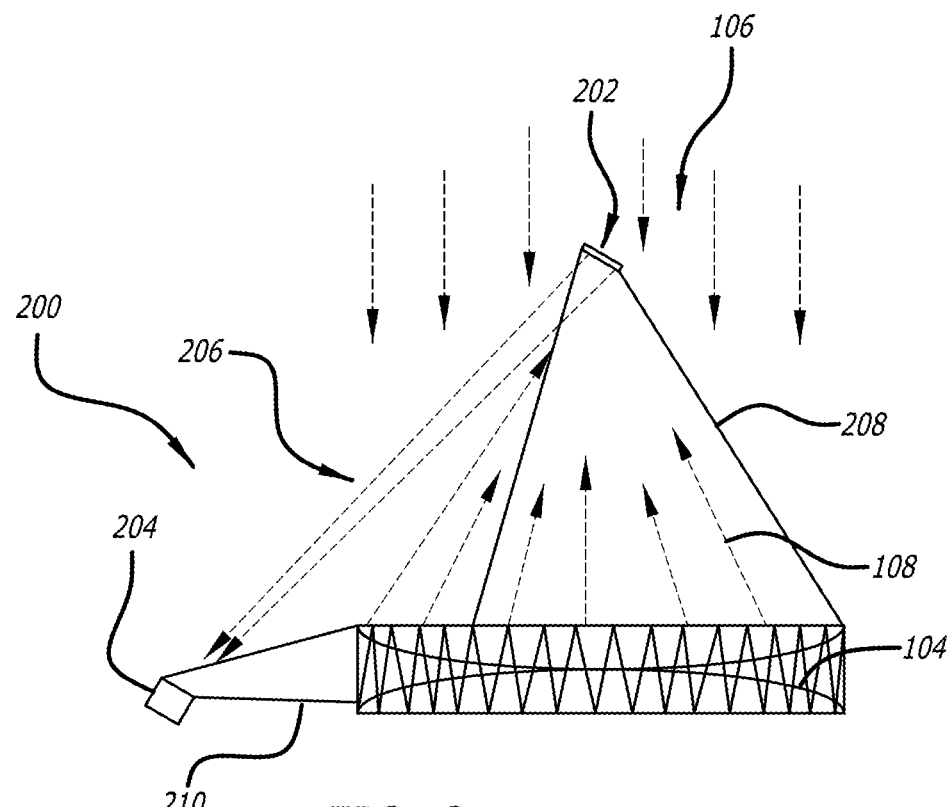
FIG. 2 illustrates an exemplary solar collector according to embodiments described herein.

FIG. 2 illustrates an exemplary solar collector according to embodiments described herein. The exemplary solar collector 200 of FIG. 2 may be similar to FIG. 1 including a reflective surface 102 and outer frame 104. At the focal area of the collector, however, may be positioned a second reflective surface 202, such as a mirror. The second reflective surface 202 may be used to redirect the collected solar energy to a desired location. As illustrated, solar rays 106 may be reflected rays 108 off of the primary reflective surface to the second reflective surface 202 and then reflected 206 again to a collector 204. The collector may be any structure that may receive the concentrated solar energy. For example, the collector may be a structure configured to be heated by the solar energy.

Exemplary embodiments of the collector 200 of FIG. 2 permit the collected energy of the sun to be redirected to a desired collection point. In an exemplary embodiment, the collector 204 and/or second reflector 202 may be configured to move relative to each other and/or the primary reflective surface in order to redirect the sun's energy to a desired location. In an exemplary embodiment, the primary reflector may be configured to move, rotate, and/or tilt in order to track the sun. The secondary reflector may then be used to redirect the collected solar energy to the collector at a stationary location for continued use. The second reflector 202 and/or collector 204 and/or primary reflector, may be on a translation stage, gimble, or other structure to permit the structures to move as described herein. In an exemplary embodiment, the second reflector 202 and collector 204 may be coupled to the outer frame 104 by one or more booms 208, 210. The booms may be configured to move, such as telescope, rotate, or tilt, to position the components is a desired relative position to each other.

Although the reflective surface is shown as symmetric about an axis, other exemplary embodiments are contemplated herein. For example, off-axis focal points may be configured and the corresponding placement of the collector and/or secondary reflector may be repositioned accordingly. Because of the structure of the primary reflective surface through the use of the mesh structure, the shape of the reflective surface can be tailored to any desired surface shape. The exemplary shape is circular, ovoid, or parabolic in which the focal point is approximately on axis of the reflective surface. However, the shapes, configurations, orientations, or portions of the reflective surface and corresponding attachments to the support structure or between support structures can change shape and may therefore result in off-axis configurations. The booms used to support the collector or secondary reflector can be designed to position the respective components in desired locations depending on the design of the reflective surface, sun position, orientation and/or location of the primary reflector, other attributes, or combinations thereof.

Figure 3:
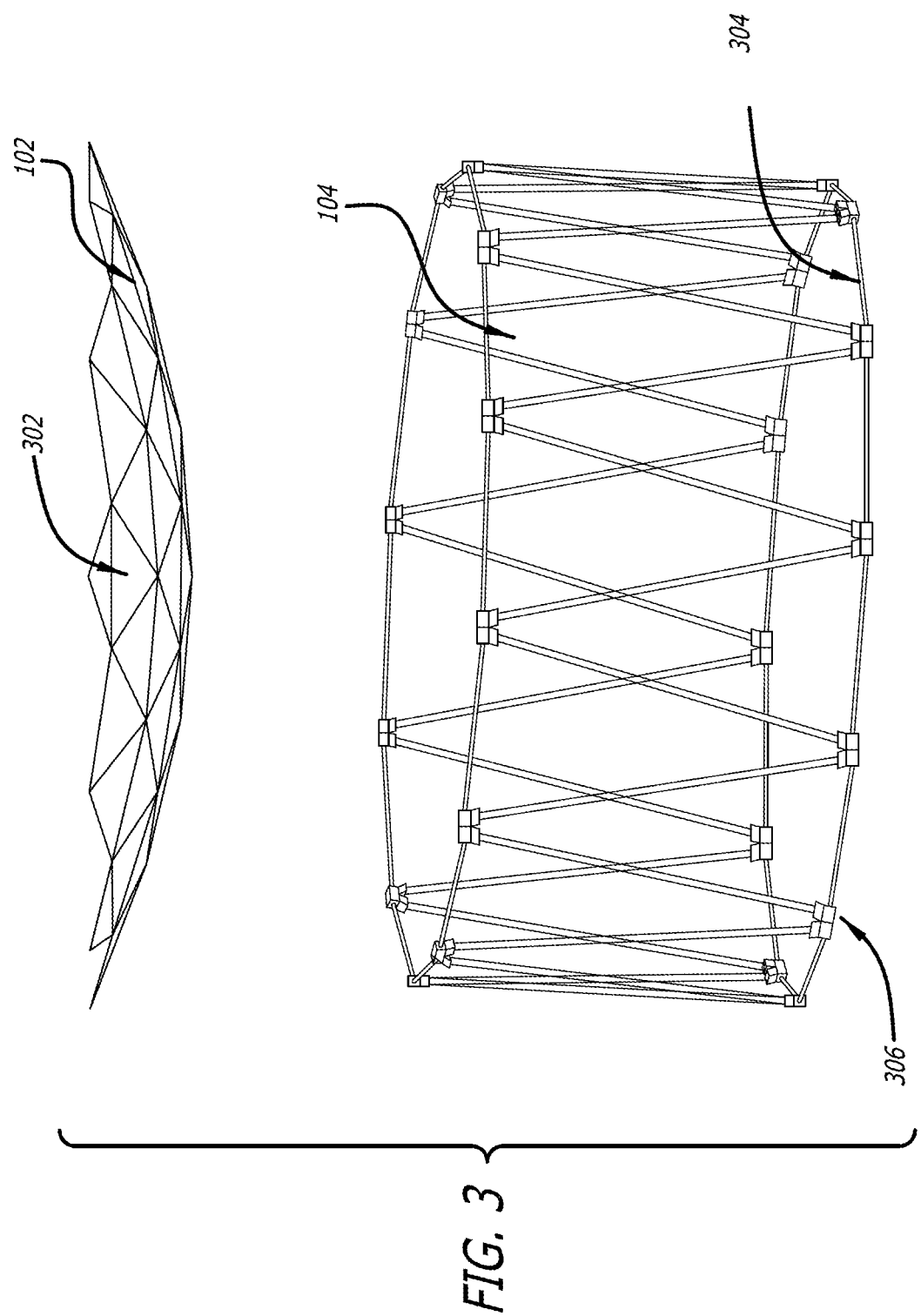
FIG. 3 illustrates an exemplary exploded component part view of an exemplary solar collector according to embodiments described herein.

FIG. 3 illustrates an exemplary exploded component part view of an exemplary solar collector according to embodiments described herein.

In an exemplary embodiment, the outer frame 104 may comprise a stowed configuration and a deployed configuration. The outer frame 104 may be configured to transition the solar collector from the stowed configuration to the deployed configuration. In an exemplary embodiment, The outer frame 104 may comprise deformable members 304 and/or hinged members 306 to permit the outer frame to fill a smaller volume in the stowed configuration than the deployed configuration. In an exemplary embodiment, the outer frame 102 may comprise members of shape memory material that may deform in the stowed configuration under application of an outside force but that may return to a remembered shape in the deployed configuration when the outside force is removed. Other deployable materials may also be used, such as temperature dependent shape memory materials in which a change in temperature may be used to transition the material from one shape to another shape. Tape springs may also be used that have a biased configuration in a lengthwise shape and can be bent for deformation. Tape springs may include a contoured cross sectional area, such as a curved shape, similar to a measuring tape that permits deformation, bending and rolling, but which returns to the elongated configuration upon removal of the external force.

In an exemplary embodiment, the outer frame 104 is configured to passively transition from the stowed configuration to the deployed configuration. The passive deployment means that other mechanical actions are not necessary to assist in the deployment, such as in using an inflation gas, motors, or other action to deploy the structure. In an exemplary embodiment, a passive deployment may be achieved through the removal of a constraining (or outside) force that retains the solar collector in the stowed configuration.

Exemplary embodiments described herein include a reflective surface 102. In an exemplary embodiment, the reflective surface 102 is tessellated. The tessellated surface creates an overall reflective surface shape through the use of piece wise reflective members 302. The piece wise members 302 in a desired configuration approximates the desired shape of the overall reflective surface 102. For example, flat piece wise members may be used if their size is sufficiently small that the combination of the members orientated and positioned relative to adjacent members approximates the desired configuration, such as a parabolic surface. The approximation may be determined by the collection efficiency of the overall design, which may take into consideration the permissible maximum size of the collector and the amount of energy to be collected from the sun through the collector. In an exemplary embodiment, the piece wise reflective members are separated from each other by a small gap so that the members do not overlap in the deployed configuration. The separation is preferably minimized in order to improve the efficiency of the collector for a given size. However, the gap between piece wise members may be used to position support structures as described herein, and therefore may be non-zero.

Exemplary embodiments of the reflective surface described herein may comprise a tessellated parabolic reflective surface that is a combination of individual piece wise reflective members. The individual piece wise reflective members may be catenary triangular gores attached to a tensioned mesh weave as described herein to create the desired curved shape of the reflective surface. The individual piece wise reflective surfaces may be planar when tensioned in the deployed configuration.

Figure 4:
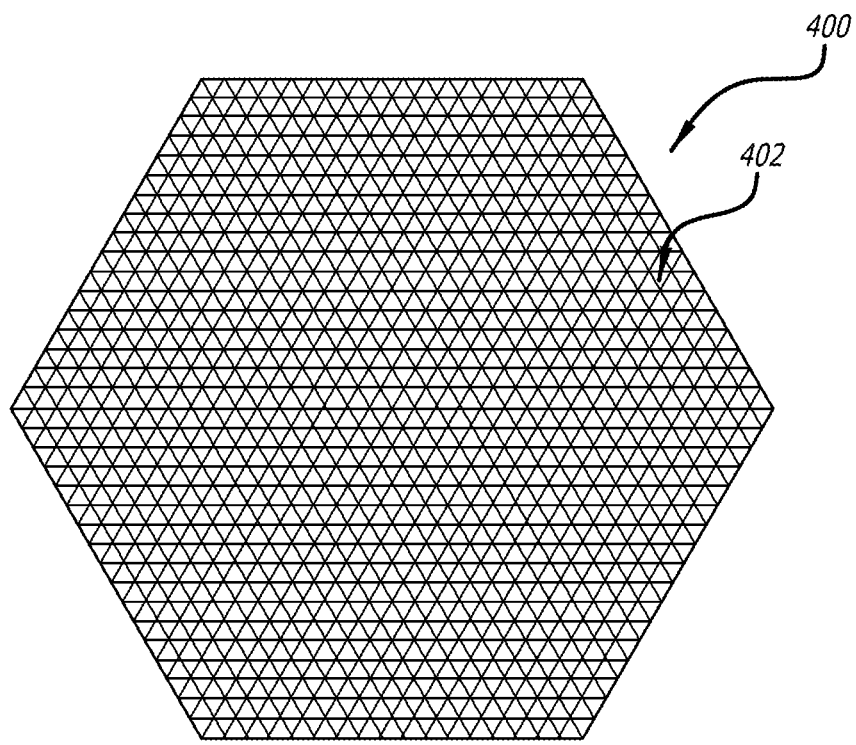
FIG. 4 illustrates an exemplary tessellated reflective surface of an exemplary solar collector according to embodiments described herein.

FIG. 4 illustrates an exemplary top view of the tessellated reflective surface of an exemplary solar collector according to embodiments described herein. As illustrated, the overall reflective surface 400 may define a general outer perimeter that is hexagonal. Other shapes are also contemplated, such as generally circular, pentagon, rectangular, square, etc. In an exemplary embodiment, the piece wise reflective members 402 that creates the tessellated reflective surface are generally triangular. In an exemplary embodiment, the tessellated reflective surface may comprise hundred or thousands of piece wise reflective members.

Figure 5:
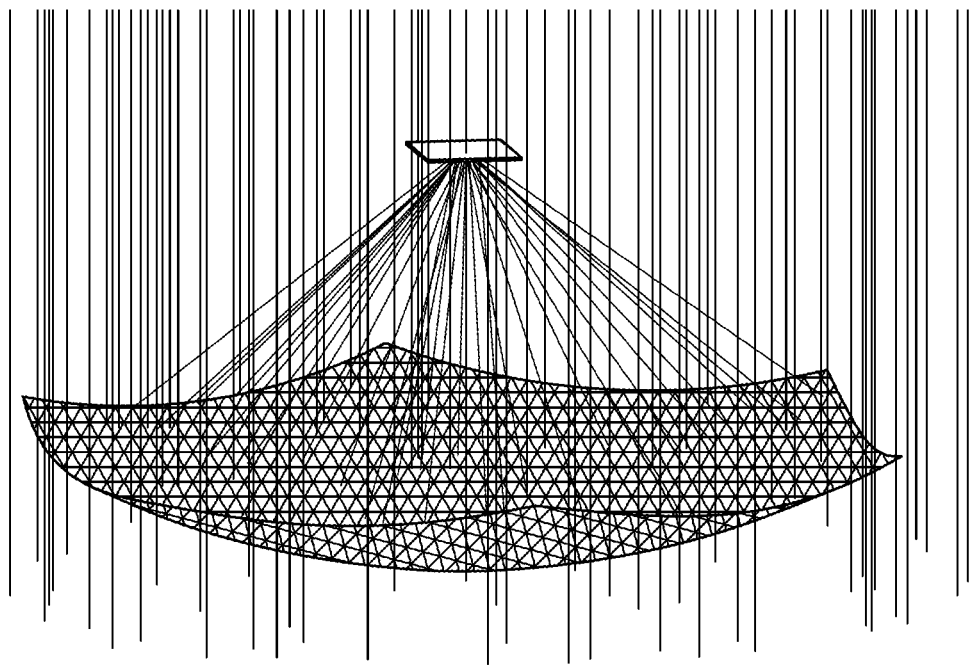
FIG. 5 illustrates an exemplary ray tracing form the exemplary tessellated reflective surface of FIG. 4.

FIG. 5 illustrates an exemplary ray tracing from the exemplary tessellated reflective surface of FIG. 4. Exemplary embodiments of the tessellated reflective surface may be configured to permit the piece wise control of the collector. As illustrated, exemplary ray tracing of solar rays are provided to illustrate the reflection of the sun's ray off of the piece wise reflective member to the focal area above the reflective surface.

Figures 6, 6A:
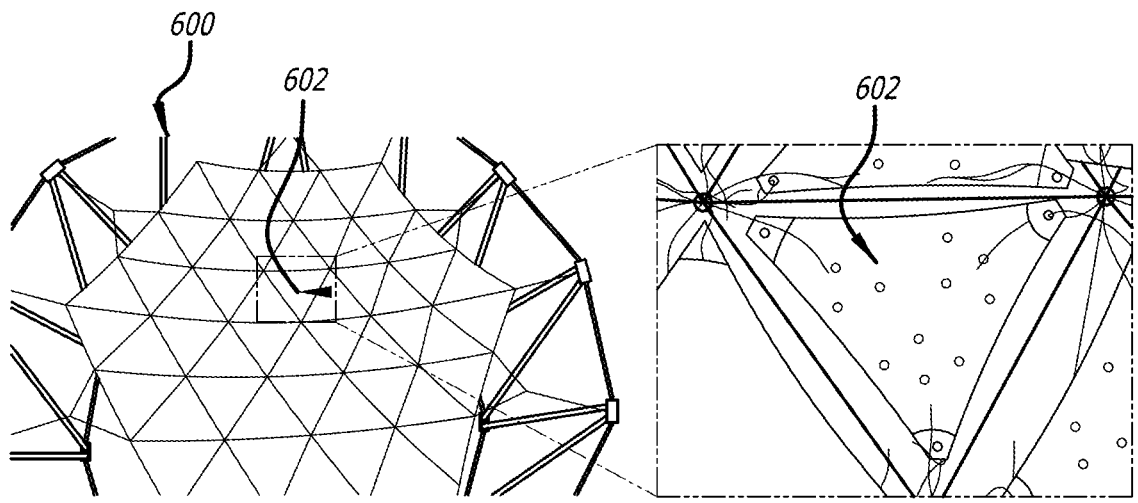
FIG. 6 illustrates an exemplary tessellated reflective surface of an exemplary solar collector according to embodiments described herein with FIG. 6A being an expanded view of a single reflective portion of the reflective surface.

FIG. 6 illustrates an exemplary tessellated reflective surface of an exemplary solar collector according to embodiments described herein with FIG. 6A being an expanded view of a single reflective portion of the reflective surface. In an exemplary embodiment, the reflective surface 600 comprises a plurality of individual piece wise members 602.

In an exemplary embodiment, the individual piece wise members 602 are shaped, oriented, and positioned to approximate a desired shape of a reflective structure. In an exemplary embodiment, the individual piece wise members 602 may be flat. The individual piece wise members 602 may also be curved about one or two axis.

Exemplary embodiments of the individual piece wise members 602 may comprise a membrane. The individual piece wise member may comprise a metalized layer between two transparent films. The transparent films may be used to reduce metalization loss during fabrication, transportation, stowage, and/or deployment. Exemplary embodiments may also use a single transparent film having a metalized layer deposited or reflective coating thereon.

In an exemplary embodiment in order to improve the smoothness o the individual piece wise member and minimize loss of solar light, the individual piece wise member may be under tension in the deployed configuration. Other exemplary embodiments of the piece wise member may also reduce deformation of the individual member and the associated loss of solar light. For example, the individual member piece may be a rigid structure. For example, the rigid structure may be glass, metal, composite, etc. The rigid structure may comprise a surface shape to improve reflection of solar energy to the collection area.

Figure 7:
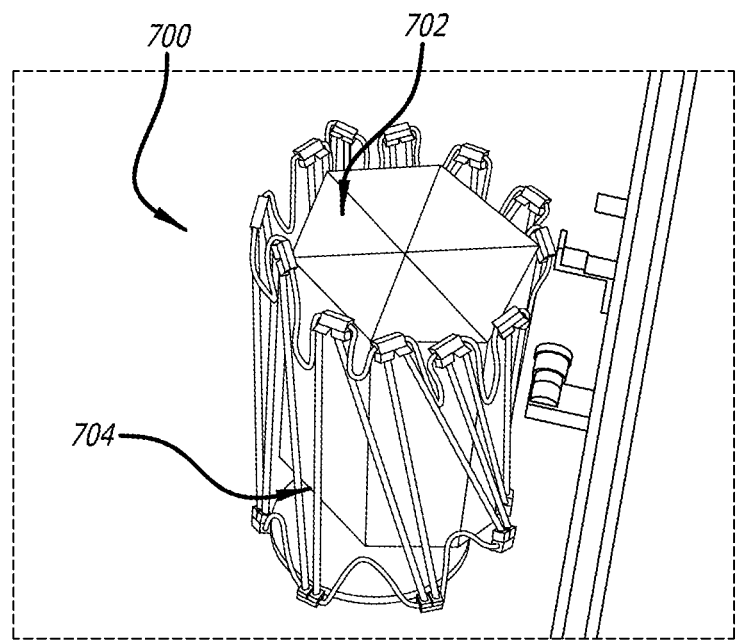
FIG. 7 illustrates an exemplary solar collector in a stowed configuration according to embodiments described herein.

FIG. 7 illustrates an exemplary solar collector in a stowed configuration according to embodiments described herein.

As illustrated, the example stowed configuration of the solar collector 700 permits the compact stowage of the solar collector. As illustrated, the outer frame 704 may reduce in volume by bending at the longerons, and reorienting the struts to generally align. The reflective surface may fold so that the individual piece wise reflective member move in relation to each other through deformation of the support structure while maintaining the general shape of the individual members. As illustrated, the plurality of individual reflective members may be positioned on top of each other or adjacent to each other so that the individual reflective members are not deformed or folded in the stowed configuration. Exemplary embodiments of the tessellated reflective surface contributes to the highly efficient folding and low mass of the system while maintaining a precision reflective surface upon deployment. The intentional folding of the support structure so that the individual reflective members are not folded may improve the surface configuration upon deployment.

Figure 8:
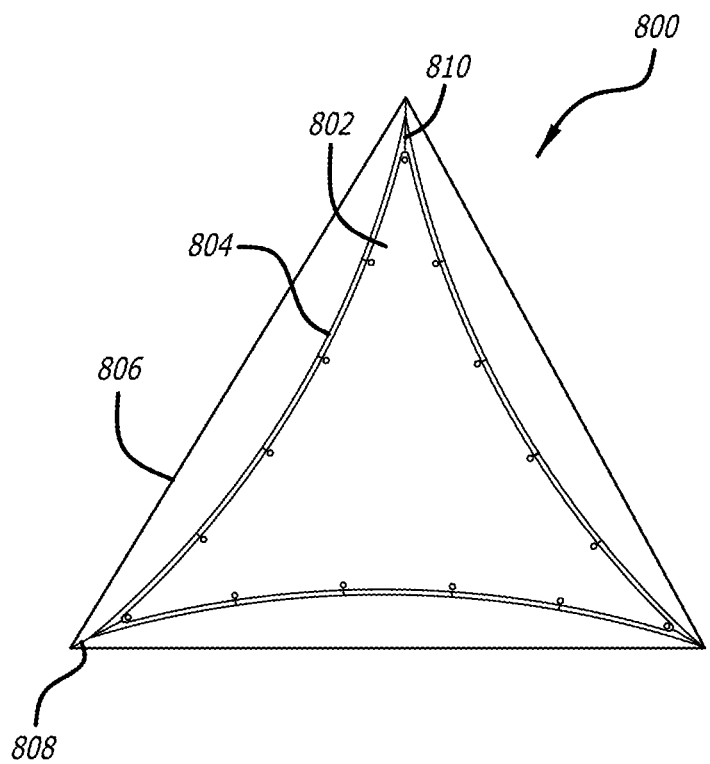
FIG. 8 illustrates an exemplary membrane within a support structure of the tessellated reflective surface according to embodiments described herein.

FIG. 8 illustrates an exemplary individual piece wise reflective member within a portion of the support structure of the tessellated reflective surface according to embodiments described herein.

In an exemplary embodiment, the reflective surface is tessellated into individual piece wise reflective members. The exemplary tessellated piece 800 of the overall reflective surface may include the piece wise reflective member 802 and a support structure 806. The support structure 806 may be configured to put the piece wise reflective surface 802 under tension through connectors 808 between the piece wise member 802 to the support structure 806. The tension of the piece wise reflective member may reduce deformations of the surface and improve solar collection.

As illustrated, the piece wise reflective member 802 may comprise a geometric shape. As illustrated, the piece wise reflective member 802 is generally triangular with three apexes. Other shapes are also contemplated herein including, square, rectangular, pentagon, hexagon, etc. In an exemplary embodiment, the piece wise reflective member 802 comprises a plurality of apexes in which the apex of the individual reflective member is coupled through a connector 808 from the piece wise reflective member 802 to the support structure 806. In an exemplary embodiment, the connection may include a spring 810 or other tensioning element in order to put the individual reflective member 802 under tension within the support structure in the deployed configuration.

As illustrated, the perimeter edges of the individual piece wise members 802 may be curved. In an exemplary embodiment, the edge is shaped as a catenary curved edge. Other configurations may include straight edges. An exemplary embodiment of the piece wise member in a triangular shape having catenary edges may be configured to permit attachment at the corners (apex) of each triangle to result in a flat reflective surface. A spring may be connected at one or more corner (apex) of the triangle to the support structure to tension the reflective triangle element when the solar collector is fully deployed. In an exemplary embodiment, only a single apex of the piece wise reflective member has a tensioning member coupled thereto, such as with a spring. The spring may be from a wound structure and/or from a longitudinal elastic extendable structure and/or from another structure configured to change length and having a biasing force to return the structure to a shortened configuration when elongated.

Exemplary embodiments may include reflective membranes as the individual reflective members. The reflective members may be membrane gores that are flexible. The membranes may be used to reduce size and weight of the overall solar collector. Exemplary embodiments may also or alternatively use rigid reflective members. The rigid reflective members may be supported through the support structure as described herein. The rigid reflective members may or may not be under tension and/or may or may not use tensioning elements, such as springs to apply additional tension to the reflective member. The rigid reflective members may define a surface shape that is flat and/or curved. The surface shape may be retained regardless of the tension put on the rigid reflective member, at least for the tension applications contemplated by the support structure.

Exemplary embodiments described herein support the individual piece wise reflective member through a support structure 806. Exemplary embodiments of the support structure comprise flexible members for easy storage as described with respect to FIG. 7. In an exemplary embodiment, the support structure comprises a string that is coupled together at nodes positioned adjacent the apex of the individual piece wise reflective members. The nodes may be crossing, or knots, or other attachment of string together at a point. The nodes may create connection points for the individual piece wise reflective members.

Exemplary embodiments of the support structure comprises a mesh string frame. The string may be coupled to the outer frame and extend in a pattern across an interior of the outer frame. When the outer frame is deployed, the mesh string frame is expanded and positioned in a desired configuration. The nodes of the mesh string may be used to position the reflective surface is a desired shape.

Figure 9:
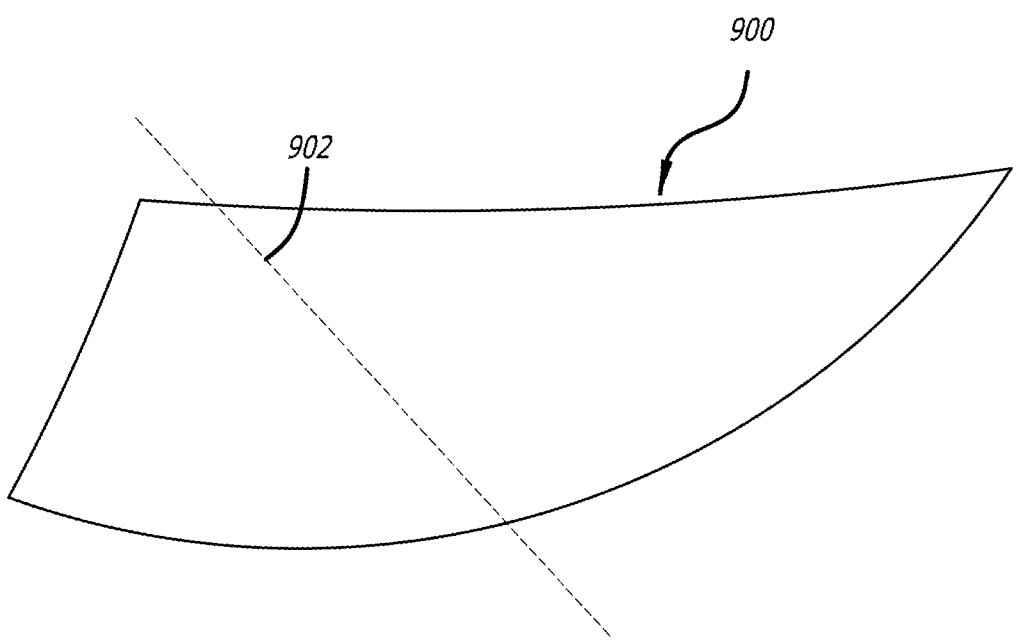
FIG. 9 illustrates an exemplary membrane of the tessellated reflective surface according to embodiments described herein.

FIG. 9 illustrates an exemplary membrane of the tessellated reflective surface according to embodiments described herein.

As described herein, the individual reflective members may be generally planar. The surface smoothness of a flat member may be maintained by putting the individual reflective member under tension. Exemplary embodiments may also include other surface configurations. For example, as illustrated in FIG. 9, the individual reflective members may be generally flat and then curved about an axis 904. The axis of curvature along individual reflective members may be different from adjacent individual members so that the individual members can be positioned adjacent to each other based on their shape and orientation and then curve in generally the same direction about the reflective surface defined by the combination of individual reflective members. When combined in the reflective surface configuration, the individual piece wise reflective members may be curved circumferentially about the reflective surface and be generally linear or flat in a direction radially outward, or perpendicular to the circumferential direction. The individual reflective members may be substantially the same shape with substantially the same curvature to create the reflective surface. Alternatively the individual reflective members may be different in which the shape is approximately the same but having varying curvatures to create the reflective surface. Exemplary embodiments also include different curvature configurations. For example, the individual reflective members may be curved about two different axis. The individual reflective member may comprise a portion of a spherical, ovoid, or parabolic curve. In an exemplary embodiment, the individual reflective member comprises a double ais curved surface. The first axis of curvature may be oriented such that the curvature is circumferential about the reflective surface. The second axis of curvature may be oriented perpendicular to the first axis of curvature.

Figure 10:
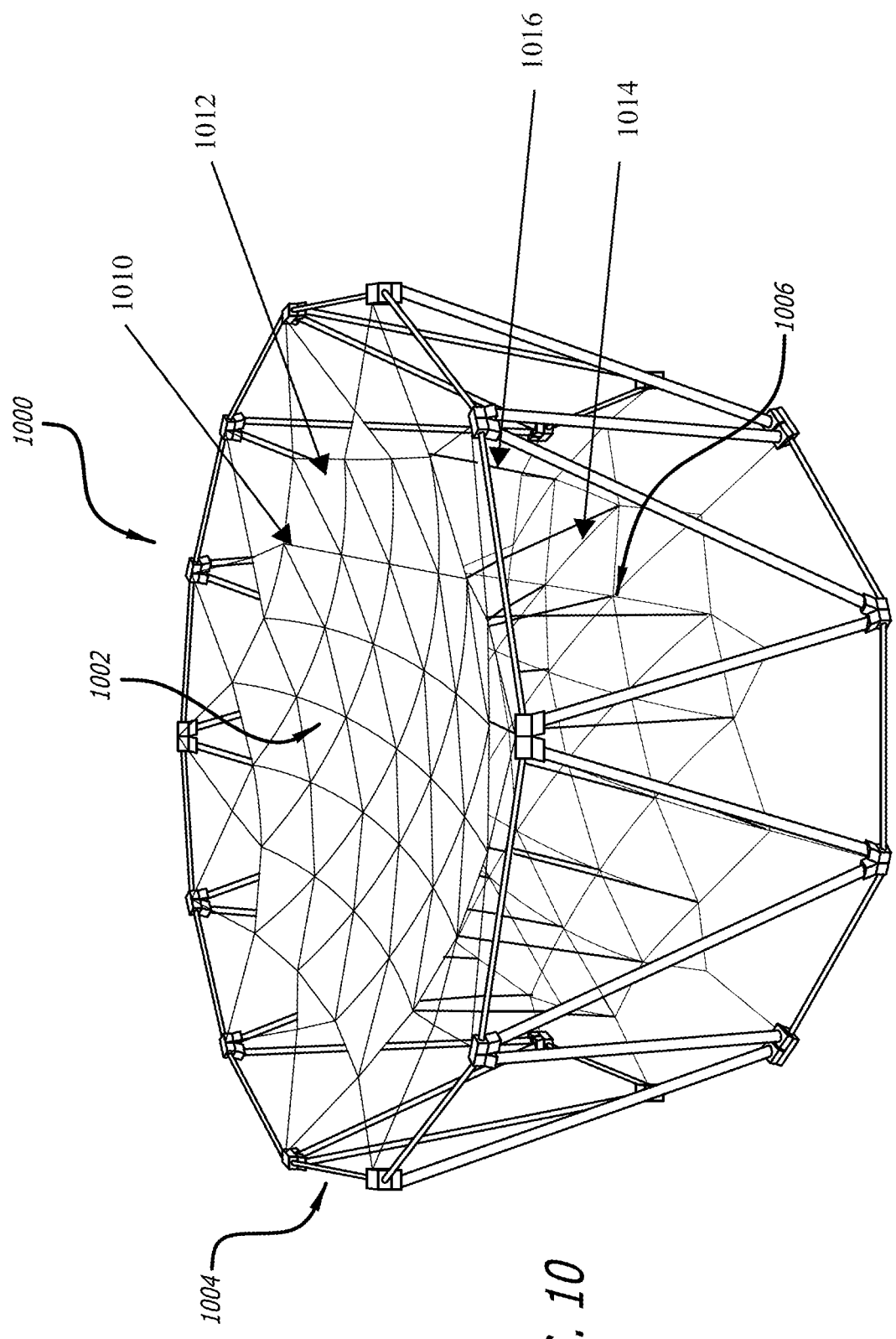
FIG. 10 illustrates an exemplary solar reflector in a deployed configuration.

FIG. 10 illustrates an exemplary solar reflector in a deployed configuration.

Exemplary embodiments of the solar collector 1000 as described herein may include a reflective surface 1002, supported on a net mesh 1006, that is coupled to the support frame 1004. The support frame 1004 may include rigid members to generally define an outer shape of the support structure. The support frame 1004 may be used to transition the solar collector between the stowed configuration and the deployed configuration. The support frame 1004, in the deployed configuration expand the net mesh 1006 and puts the internal support structure in tension. The support frame 1004 may also include collapsible, rotatable, flexible or other configuration to permit the expansion/retraction of the frame between the stowed and deployed configuration.

As illustrated, the support structure comprises a plurality of segments that come together at nodes. Through the attachment of segments together from a top side to the bottom side of the support frame the support structure at the support surface may be contoured to a desired shape. For example, the support structure may be pulled toward the opposite side such that a thickness across the support structure is lowest in the middle of the reflective surface and widest near the support frame 1004.

Exemplary embodiments of the net mesh comprises flexible strings to that are attached. The flexible strings may be collapsed, and deformed in the stowed configuration for compact storage. The folding of the support structure and the individual reflective members may be in a specific pattern to reduce tangling.

FIG. 10 is shown as representative only. The individual reflective members that define the reflective surface 1002 may, in one embodiment, be configured and support by the net mesh as illustrated more accurately in FIG. 6A and/or FIG. 8. The attachment of the individual reflective members with respect to these embodiments is therefore equally applicable to the configuration illustrated in FIG. 10. Specifically, the individual reflective member of the reflective surface (illustrated generally as triangles in FIG. 10), may be the piece wise reflective member 802 of FIG. 8. The individual reflective member may then be support through the net mesh that is the support structure 806 of FIG. 8.

Exemplary embodiments of the support structure includes mesh elements that extend under the reflective surface to create a deformation force upon the support structure and define a shape of the reflective surface. Exemplary embodiments of the net mesh comprise a Vectran string network. As illustrated, the support structure used to support the piecewise members comprises string. The string configuration can be mirrored on the opposing side of the support frame with strings extending therebetween (either directly or through additional nodes), so that the reflective surface is deformed to a desired shape when expanded. The use of the nodes between the support structure of strings and the mirrored structure of strings on the opposite side of the support frame may be to control or reduce tangling of the mesh structure when stowed and/or during deployment. The additional nodes may also be used to create desired contours by imposing forces on the support structure supporting the individual reflective members.

As illustrated, the reflective surface 1002 comprises a support structure 1010 comprising threads that support individual reflective elements 1012. An opposite support structure 1014 comprising threads may be a mirror image of the support structure on an opposite side of the support frame 1004. An intermediate mesh 1016 of threads may coupled the support structure to the opposite support structure. The threads on the support structure, intermediate mesh, and/or the opposite support structure may comprise nodes where a plurality of threads come together.

Exemplary embodiments of a solar collector as described herein may include a frame. The frame may comprise structure elements. Structural elements may be rigid and/or deformable.

Exemplary embodiments for structural elements that are deformable may include various composites that are a combination of high strength structural fibers and a resin matrix. High strength structure fibers include, but are not limited to, carbon fiber, glass fiber, liquid crystal polymer fibers, Vectran, Zylon, aramid fibers, Kevlar, nomex, high density polyethylene fibers, Dyneema Spectra, among others. Resins may include, but are not limited to, epoxy, polyurethane, silicone, ethylene propylene, diene monomer, cyanoacrylate, polyester, vinyl ester, phenolic, alkyd, acrylic, polycarbonate, polyamide, polypropylene, etc.

Exemplary embodiments described herein include structural elements. Exemplary embodiments of the structural elements may include shape memory composite material. The shape memory composite material may include a flexible material that is deformable when an external force is applied, and returns to a remembered shape when the external force is removed. The structural elements may permit unstructured deformation based on the application of the external force and not on a preformed or predesigned construction of a deformation. Exemplary embodiments comprise structural deformation nodes that may permit both structured and/or unstructured deformation. Exemplary embodiments may include rigid nodes for coupling the flexible structural elements. Exemplary embodiments described herein define a structural frame from the structural elements.

Exemplary embodiments described herein may include additional flexible members coupled to the structural elements. The flexible members may be configured to provide support for the reflective surface through the application of tension to the flexible members. In contrast to the structural elements, the flexible members may be fully flexible without a predefined shape. The structural elements may have a predefined, remembered shape that may be retained when the structural element does not have an outside deformation force applied thereto. The structural elements may be flexible under and application of the outside deformation force to deform the structural element.

As illustrated, the reflective surface may be supported by a support structure. The support structure may comprise a mesh. Exemplary embodiment of the mesh may include high strength structural fibers including, but not limited to, carbon fiber, glass fiver, liquid crystal polymer fibers (Vectran and/or Zylon), aramid fibers (Kevlar and/or Nomex), high density polyethylene fibers (Dyneema and/or Spectra), etc.

In an exemplary embodiment, the additional flexible members may define the support structure such as the net mesh described herein. In an exemplary embodiment, the reflective surface may be coupled to the additional flexible members. The reflective surface may comprise a plurality of individual piece wise members. The connection to the support structure may be used to position the reflective surfaces in a desired orientation.

For reflective members, exemplary embodiments may include polymeric films such as, without limitation, polyethylene terephthalate, polyimide, perfluoralkoxy and ethylene tetrafluoroethylene, polyethylene, polyvinyl chloride, polyamides, polystyrene, etc. To make the films reflective, metal can be deposited on the surface such as aluminium, silver, gold, etc. Exemplary embodiments may comprise aluminium metalized Mylar. Other metallic layers may also be used, such as silver or gold. Candidates for film elements can also include rigid mirror elements such as glass with metalization or thin carbon composites with metalization or metalized film laminated on one side.

Exemplary embodiments described herein may be used to deform the structure in a non-structured format for easy storage. Exemplary embodiments may include a deployed configuration that transitions to the deployed configuration through passive remembered transitions of the structural elements.

FIGS. 11A-11C illustrates the deployment from a stowed configuration to a deployed configuration of the support frame of an exemplary solar collector according to embodiments described herein. FIG. 11A illustrates an exemplary portion of an outer frame in a stowed configuration; FIG. 11B illustrates the exemplary portion of the outer frame in a partially deployed/transition configuration; and FIG. 11C illustrates the exemplary portion of the outer frame in a fully deployed configuration. The portion illustrated is for ease of explanation. It is understood that the portion illustrated can be repeated and deformed in a circular configuration in order to define a cylindrical frame as illustrated in embodiments described and illustrated herein. FIG. 11B represents bending locations of shape memory carbon composite (SMCC) materials using a circle/oval. Exemplary embodiments of the flexible portions may comprise hinge locations at specific locations and/or the flexible portions may be flexile along a length of the member to permit bending at different locations and/or at locations as dictated by the application of forces to collapse the frame.

In an exemplary embodiment, the outer frame is deformable so that it can change shape from the stowed configuration to the deployed configuration. As illustrated, the outer frame may comprise a plurality of members. The members may comprise diagonal members 1104 and rim members 1102. In an exemplary embodiment, the rim members 1102 are deformable to bend 1108 along their length. In an exemplary embodiment, the rim members 1102 are configured to bend inward so that the diagonals transition to generally angled relative to each other in the deployed configuration to generally parallel to each other in the stowed configuration. The bending of the rim members 1102 permits the stowed configuration height to be approximately equal to the length of the diagonal member 1104. In an exemplary embodiment, two diagonal members 1104 come together at a joint 1106 with two rim members. In an exemplary embodiment, the joint comprises a rigid attachment to one of the two diagonal members and a rotational and/or flexible attachment to the other of the two diagonal members. In an exemplary embodiment, the joint may comprise more than one flexible or rotational connections. In an exemplary embodiment, the hinged connection permits the realignment of the down diagonals with respect to each other, and the rim member may deformed therein.

In an exemplary embodiment, the rim member 1102 may be deformable as described herein. The deformation may permit a bending of the member such as at a hinge 1108. In an exemplary embodiment, the rim member 1102 may comprise a shape memory composite material. Exemplary embodiments of the shape memory composite permits the deformation of the structure through an application of an outside force. When the outside force is removed, the shape memory composite may return to a remembered shape. In an exemplary embodiment, the remembered shape is a straight strut member. The remembered shape may be the original and/or unforced shape of the shape memory composite. When in the stowed configuration, the rim member 1102 may be deformed by pending the strut. In an exemplary embodiment, the shape memory composite material may permit non-structured deformation of the member.

Exemplary embodiments of the rim member 1102 may comprise a foldable structural elements. In an exemplary embodiment the rim member 1102 comprise a shape memory carbon composite material. Other foldable structural elements may also be included, such as tape springs, springs, hinges, biased hinges, etc. Exemplary embodiments of the hinged structure permits highly efficient folding for stowage. In an exemplary embodiment, the foldable member is configured to passively transition to the deployed shape. The passive deployment may be through a biasing of the member to the deployed configuration. Exemplary embodiments of the passive deployment may be through the remembered configuration of the shape memory material, a biasing element such as a spring or compression element, etc. for the structure to revert to the deployed configuration unless otherwise constrained.

Exemplary embodiments of the outer frame described herein may comprise truss designs. Exemplary truss described herein may be composed of rigid carbon composite rods and shape memory carbon composite longerons. The exemplary rods may comprise rigid structures. For example the rods may comprise a rigid carbon-epoxy composite material. The longerons may comprise shape memory carbon composite rods for folding as described herein. Exemplary embodiments of the carbon composite shape memory material includes unidirectional carbon fibers impregnated with a highly elastomeric resin.

Figure 12C:
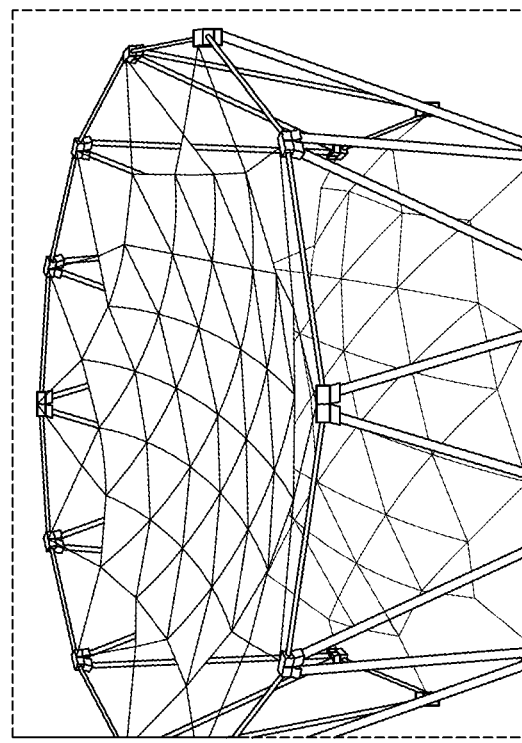
FIGS. 12A-12C illustrate an exemplary method of deployment of a solar collector according to embodiments described herein.
Figure 12B:
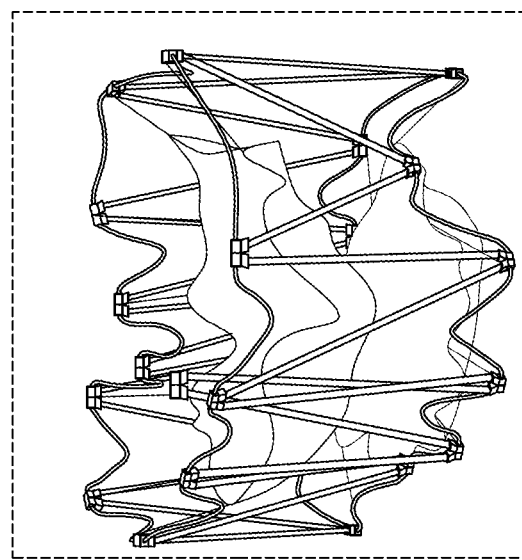
Figure 12A:
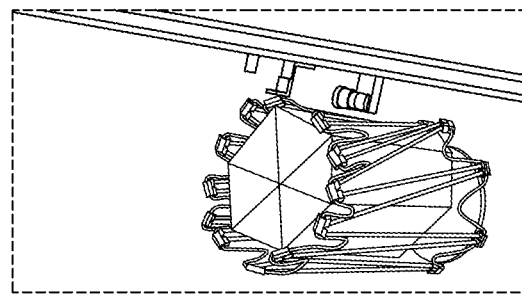

FIGS. 12A-12C illustrate an exemplary method of deployment of a solar collector according to embodiments described herein.

An exemplary method for deployment may include providing a solar collector as described herein. The solar collector may be in a stowed configuration. The stowed configuration may be with an outer frame in a collapsed configuration by bending or deforming flexible members in the outer frame. The internal support structure may be deformed as well and individual reflective members configured in a stowed configuration that is not creased. The solar collector may be maintained in the stowed configuration through application of an external force.

The method of deploying the solar collector may include expanding the outer frame. The outer frame may include shape memory components. Therefore, through application of a specific temperature, through removal of an outside force, and/or combinations of transition mechanisms, the outer frame expands toward the deployed configuration. As the outer frame expands, the outer frame deploys the internal support structure and pulls the individual reflective members toward the reflective surface shape.

The method of deploying the solar collector comprises transitioning the outer frame to a fully deployed shape. In the fully deployed shape, the outer frame puts tension on the internal support structure. The internal support structure may also put tension on the individual reflective members. The tension of the structure against the bias of the support frame to fully deploy keeps the solar collector deployed. The solar collector is positioned at a desired position with either a collector at the ray focal area and/or with a secondary reflector positioned at the ray focal area and oriented to redirect the collected light to the collector at another location.

Exemplary embodiments of the folding process described herein may be used to permits the reflective elements to be positioned in a compact configuration for storage while mitigating mesh entanglement and reducing surface perturbations from creasing or other reflector deformations that can occur to membrane surfaces.

Figure 13:
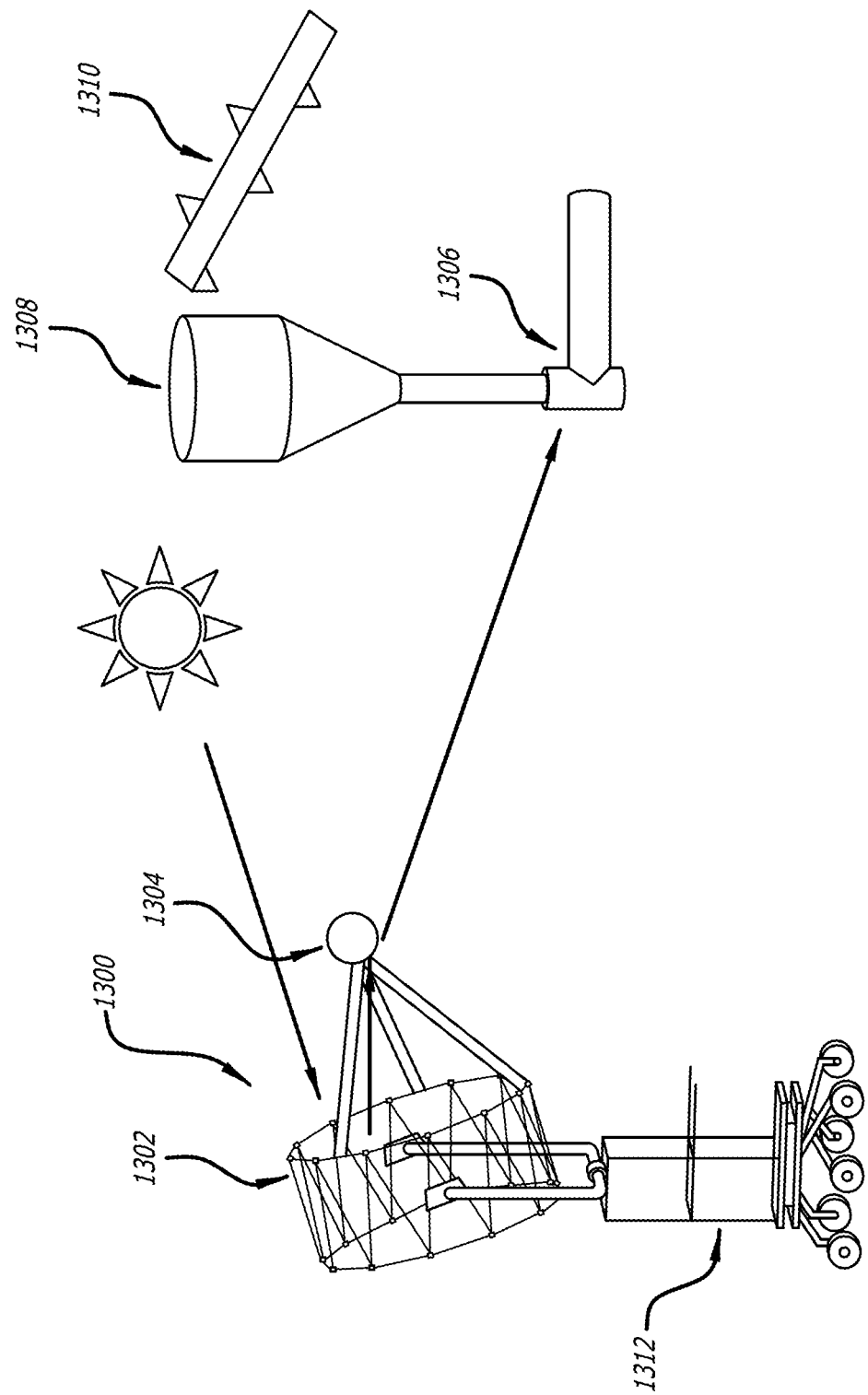
FIG. 13 illustrates an exemplary solar collector according to embodiments described herein in an application that may be used on a ground surface, such as for lunar environments.

FIG. 13 illustrates an exemplary solar collector according to embodiments described herein in an application that may be used on a ground surface, such as for lunar environments.

Exemplary embodiments described herein may comprise a lightweight, a high power to mass and low stow volume solar concentrator. Exemplary embodiments are designed for use for collecting sunlight at the lunar surface for use in situ resource utilization. For example, oxygen, water, metals, or other elements of interest may be extracted from lunar regolith. Therefore, the solar concentrator according to embodiments described herein may be used to concentrate sunlight at the lunar surface, specifically for oxygen extraction from lunar regolith. Exemplary embodiments of the solar concentrator, may also have applications for providing a heating source. The solar concentrator may be used to melt materials, such as for building structures.

On the lunar surface, exemplary embodiments of the solar collector described herein may be placed on a platform. The platform may be motorized. The motorized platform may comprise a turntable that is able to rotate and/or tilt to track the sun. The platform may be configured to move physical location. For example, the platform may comprise a wheeled lower portion for transport across a surface. The wheeled lower portion may be motorized, such as like a rover.

The production of oxygen, metals, water, other elements of interest, heat, energy, etc. at the lunar surface is desirable to support colonization. Technologies to support utilization of in situ resources and materials to support long term missions is highly desirable. Oxygen production for both propellant oxidizer and for life support is particularly desirable. Different extraction methods of oxygen from lunar regolith are possible, including, for example, hydrogen reduction, carbothermal reduction, and vacuum pyrolysis. All or many of the extraction methods can use direct solar energy input to drive the process. Exemplary embodiments of the solar collector described herein may therefore be used to extract oxygen from regolith on the lunar surface. Besides oxygen, water may also be harvested from regolith which can be used to sustain life on the lunar surface as well as provide fuel for deep space travel. Exemplary embodiments described herein may also be used to concentrate light on solar arrays to generate energy or power.

Although described herein with respect to lunar applications, exemplary embodiments described herein may be used in other terrestrial or space applications. For example, exemplary embodiments described herein may also have Earth application in providing deployable solar collectors that can be stored and/or shipped to remote locations such as to support locations with limited resources and infrastructure, such as low income countries, and/or for remote support of military forces, etc. Embodiments described herein may also be used on other celestial surfaces, such as on other planets or asteroids.

FIG. 13 illustrates an exemplary lunar application. As illustrated, a belt scoop 1310 or other transporter may be used to deliver regolith into a collector, such as a hopper 1308. The regolith may then flow through a tube or other transport to a receiver 1306. The flow of regolith may be controlled to provide a desired rate and/or constant rate of regolith at the receiver. The receiver 1306 may be a collector of the solar energy of the solar collector 1300 according to embodiments described herein. In an exemplary embodiment of the solar collector 1300 as described herein, the solar collector 1300 may include a reflective surface 1302 configured to reflect solar energy to a focal area. Positioned at the focal area, the solar collector 1300 may include a second reflector 1304 to direct the collected solar energy to another location such as at the receiver 1306. The concentration of solar energy may increase the temperature of the receiver to a desired reaction temperature. As described herein, the solar collector 1300 may also include a stand 1312 that may translated, change the elevation, rotate, tilt, or otherwise position the solar collector 1300 include the reflective surface 1302 in a desired position, such as to track the sun. In an exemplary embodiment, the stand may be part of or positioned on a lunar rover in order to change locations of the solar collector depending on the position of the sun.

Given the application on a lunar surface, lunar dust may be problematic for the continued reflection of sunlight off of the reflective surface. In an exemplary embodiment, the solar collector may comprise dust mitigation measures. In an exemplary embodiment, the reflective surface may be charged to repel lunar dust. In an exemplary embodiment, the surface may be charged by electrifying the metallic surface. Exemplary embodiments may also or alternatively include conductive traces within or on the reflective surface and/or support structure. An electric charge through wires, surfaces, traces, etc. may be configured to apply an electric field as a method of repelling the deposition of lunar dust on the surface of the reflective element. Other options for dust mitigation may also or alternatively be incorporated, such as vibration to shake the dust off, or mechanical wiping mechanisms, such as using a brush or wiper. The system may be configured to move the support structure so that the reflective elements may be shaken. For example, the support frame may be moved toward stowage and released to slacken the support structure and rebound to apply tension thereby moving the reflective members. Mechanical mechanisms may be used to move one or more threads of the support structure and release the thread in order to apply a vibration through the support structure and to the reflective members.

Exemplary embodiments described herein may include dust mitigation features. For example, exemplary embodiments may include a conductive grid positioned on the reflective surface, such as on the individual piece wise reflective members and/or the support structure thereto. The conductive grid may be charged in order to repel dust particles. Lunar dust particles are known to be charged, positive during the day or negative at night. The charge of the reflective surface may therefore be controlled and the same as that of the lunar dust in order to repel the dust from the reflective surface.

Exemplary embodiments of the conductive grid may be highly transparent to retain the efficiency of the collector. The transparency of the conductive grid may be achieved, in one example, by using sub-micron scale grid lines.

Exemplary embodiments described herein may include lightweight, low stow volume solar concentrator. In an exemplary application, exemplary embodiments described herein may be easily deployed in a lunar environment for in-situ resource utilization.

Exemplary embodiments described herein include lightweight, low stow volume, deployable solar concentrators for use in space applications.

Exemplary embodiments described herein include structural elements. The structural elements may comprise shape memory materials. Exemplary embodiments of the shape memory materials may be molded and cured into a final configuration. After curing, the shape memory material can be aggressively packaged and stowed by deforming the structural member in a non-structural manner. The deformation of the structural elements may store strain energy. When released the shape memory material may passively revert back to its molded and cured configuration. Exemplary embodiments may comprise a lightweight and low stow volume structure that are deployable by simply releasing the constrained structure.

Exemplary embodiments described herein may include tessellated reflective surfaces. Tessellated reflective surfaces may be used herein may include a combination of reflective elements attached to a tensioned mesh weave to create an approximate curved shape.

Exemplary embodiments may include combinations of structural elements and reflective surfaces. Combining the features described herein may result in a highly accurate reflective surface shape that is able to not only reflect, but concentrate solar energy for various space applications, such as in situ resource utilization.

Exemplary embodiments of a solar collector described herein may be deployed without the user of inflation gas. Exemplary embodiments may deploy the concentrators and/or maintain a desired deployed shape of a concentrator without inflation gas, mechanical actuators, and/or additional components. Exemplary embodiments may thereby reduce complexity, weight, and/or other key factors of interest to the space applications. Accordingly, an exemplary advantage of embodiments described herein over other solar concentrators for space applications may be that it does not require inflation gas to deploy or maintain surface accuracy.

Exemplary embodiments described herein includes a solar concentrator. The solar collector can include a support frame; a support structure coupled to the support frame; and a reflective surface coupled to the support structure.

The solar concentrator may include any combination of additional features. For example, the reflective surface comprises a plurality of individual reflective members. The support structure may comprise a thread mesh. The thread mesh may define a first support structure on a first direction of the support frame. The thread mesh may define a second support structure on a second direction of the support frame opposite the first direction. The thread mesh may define an intermediate structure between the first support structure and the second support structure. The first support structure may include a plurality of nodes. The individual element of the individual reflective members may include a plurality of apexes. A first apex of the plurality of apexes is coupled to a first node of the plurality of nodes and a second apex of the plurality of apexes is coupled to a second node.

In an exemplary embodiment, the first support structure may include a plurality of nodes, and each of the individual reflective members comprises a plurality of apexes, the plurality of apexes coupled to the plurality of nodes.

In an exemplary embodiment, each of the individual reflective members defines an approximate triangular shape having three apexes, the first support structure comprises a plurality of nodes, and a first apex of the individual reflective member is coupled to a first node, a second apex of the individual reflective member is coupled to a second node, and a third apex of the individual reflective member is couple dot a third node.

In an exemplary embodiment, the individual reflective members comprises catenary curved edges.

In an exemplary embodiment, at least one of the three apexes is coupled to the first support structure through a spring.

In an exemplary embodiment, the solar concentrator may include a collector and/or a secondary reflective surface.

In an exemplary embodiment, the support frame comprises rigid members and flexible members. The support frame comprises a stowed configuration and a deployed configuration, in the deployed configuration, the support frame is configured to put each individual member under tension through the support structure.

In an exemplary embodiment, the reflective surface may be tessellated into a plurality of individual members, each individual member comprising a flat surface when under tension. Other configurations of the individual members are also included within the present disclosure. The individual member may be curved in a first axis and/or in a second axis.

Exemplary embodiments of the disclosure includes a method of concentrating solar rays. Exemplary embodiments of the method described herein includes providing a solar collector having a reflector; and positioning the solar collector so that sun's rays hit the reflector. The method may include providing the solar collector in a stowed configuration; and expanding the solar collector to a deployed configuration. The solar collector may include a plurality of individual reflective members supported by a support structure, expanding the solar collector puts the individual reflective members under tension.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A solar concentrator, comprising:
a support frame;
a support structure coupled to the support frame, the support structure comprising a thread mesh having a plurality of nodes;
a reflective surface coupled to the support structure, the reflective surface comprises a plurality of individual reflective members,
wherein an individual reflective member of the plurality of individual reflective members comprises a plurality of apexes, and a first apex of the plurality of apexes is coupled to a first node of the plurality of nodes and a second apex of the plurality of apexes is coupled to a second node of the plurality of nodes.

2. The solar concentrator according to claim 1, wherein the thread mesh defines a first support structure on a first direction of the support frame, and the thread mesh defining a second support structure on a second direction of the support frame opposite the first direction, and the thread mesh defining an intermediate structure between the first support structure and the second support structure and the first support structure comprises the plurality of nodes.

3. The solar concentrator according to claim 1, wherein the plurality of individual reflective members comprises catenary curved edges.

4. The solar concentrator of claim 1, wherein at least one of the connections of the first apex of the plurality of apexes coupled to the first node of the plurality of nodes and the second apex of the plurality of apexes coupled to the second node is through a spring.

5. The solar concentrator of claim 1, further comprising a secondary reflective surface and a receiver.

6. The solar concentrator of claim 1, wherein the support frame comprises rigid members and flexible members.

7. The solar concentrator of claim 1, wherein each individual reflective member of the plurality of reflective members comprises a flat surface when under tension.

8. The solar concentrator of claim 7, wherein the support frame comprises a stowed configuration and a deployed configuration, in the deployed configuration, the support frame is configured to put each individual reflective member of the plurality of individual reflective members under tension through the support structure.

9. A method of concentrating solar rays, comprising:
providing a solar collector having a reflector, a support frame, and, a support structure supporting the reflector and comprising a thread mesh having a plurality of nodes, wherein the reflector comprises a plurality of individual reflective members and each individual reflective member of the plurality of individual reflective members defines an approximate triangular shape having three apexes, and wherein a first apex of the three apexes is coupled to a first node of the plurality of nodes, a second apex of the three apexes is coupled to a second node of the plurality of nodes, and a third apex of the three apexes coupled to a third node of the plurality of nodes;
positioning the solar collector so that sun's rays hit the reflector.

10. The method of claim 9, further comprising:
providing the solar collector in a stowed configuration;
expanding the solar collector to a deployed configuration;
wherein the plurality of individual reflective members are supported by a support structure, and expanding the solar collector puts the individual reflective members under tension.

11. A solar concentrator, comprising:
a support frame;
a support structure coupled to the support frame, the support structure comprising a thread mesh having a plurality of nodes;
a reflective surface coupled to the support structure, the reflective surface comprises a plurality of individual reflective members,
wherein each individual reflective member of the plurality of individual reflective members comprises a plurality of apexes, the plurality of apexes couple to the plurality of nodes.

12. The solar concentrator according to claim 11, wherein the thread mesh defines a first support structure on a first direction of the support frame, and the thread mesh defining a second support structure on a second direction of the support frame opposite the first direction, and the thread mesh defining an intermediate structure between the first support structure and the second support structure, and the first support structure comprises the plurality of nodes.

13. The solar concentrator according to claim 11, wherein each individual reflective member of the plurality of individual reflective members defines an approximate triangular shape.

14. The solar concentrator according to claim 11, wherein the plurality of individual reflective members comprises catenary curved edges.

15. The solar concentrator of claim 11, wherein at least one of the connections of the plurality of apexes coupled to the plurality of nodes is through a spring.

16. The solar concentrator of claim 11, further comprising a secondary reflective surface and a receiver.

17. The solar concentrator of claim 11, wherein the support frame comprises rigid members and flexible members.

18. The solar concentrator of claim 11, wherein each individual reflective member of the plurality of reflective members comprises a flat surface when under tension.

19. The solar concentrator of claim 18, wherein the support frame comprises a stowed configuration and a deployed configuration, in the deployed configuration, the support frame is configured to put each individual reflective member of the plurality of individual reflective members under tension through the support structure.

20. A solar concentrator, comprising:
a support frame;
a support structure coupled to the support frame, the support structure comprising a thread mesh having a plurality of nodes;
a reflective surface coupled to the support structure, the reflective surface comprises a plurality of individual reflective members,
wherein each individual reflective member of the plurality of individual reflective members defines an approximate triangular shape having three apexes, and wherein a first apex of the three apexes is coupled to a first node of the plurality of nodes, a second apex of the three apexes is coupled to a second node of the plurality of nodes, and a third apex of the three apexes is coupled to a third node of the plurality of nodes.

21. The solar concentrator according to claim 20, wherein the thread mesh defines a first support structure on a first direction of the support frame, and the thread mesh defining a second support structure on a second direction of the support frame opposite the first direction, and the thread mesh defining an intermediate structure between the first support structure and the second support structure, and the first support structure comprises the plurality of nodes.

22. The solar concentrator according to claim 20, wherein the plurality of individual reflective members comprises catenary curved edges.

23. The solar concentrator of claim 20, wherein at least one of the three apexes is coupled to one of the plurality of nodes through a spring.

24. The solar concentrator of claim 20, further comprising a receiver.

25. The solar concentrator of claim 20, further comprising a secondary reflective surface.

26. The solar concentrator of claim 20, wherein the support frame comprises rigid members and flexible members.

27. The solar concentrator of claim 20, wherein each individual reflective member of the plurality of reflective members comprises a flat surface when under tension.

28. The solar concentrator of claim 27, wherein the support frame comprises a stowed configuration and a deployed configuration, in the deployed configuration, the support frame is configured to put each individual reflective member of the plurality of individual reflective members under tension through the support structure.

* * * * *